US009953465B2

(12) United States Patent
Shenoy et al.

(10) Patent No.: US 9,953,465 B2
(45) Date of Patent: Apr. 24, 2018

(54) METHODS AND SYSTEMS FOR CREATING ONLINE UNIFIED CONTACT AND COMMUNICATION MANAGEMENT (CM) PLATFORM

(71) Applicants: Subrao Venugopal Shenoy, San Jose, CA (US); Seema Subrao Shenoy, San Jose, CA (US)

(72) Inventors: Subrao Venugopal Shenoy, San Jose, CA (US); Seema Subrao Shenoy, San Jose, CA (US)

( * ) Notice: Subject to any disclaimer, the term of this patent is extended or adjusted under 35 U.S.C. 154(b) by 0 days.

(21) Appl. No.: 15/184,851

(22) Filed: Jun. 16, 2016

(65) Prior Publication Data
US 2016/0371654 A1 Dec. 22, 2016

Related U.S. Application Data

(63) Continuation of application No. 13/200,773, filed on Sep. 30, 2011, now Pat. No. 9,384,473.
(Continued)

(51) Int. Cl.
*G06F 15/16* (2006.01)
*G07C 1/14* (2006.01)
(Continued)

(52) U.S. Cl.
CPC ......... *G07C 1/14* (2013.01); *G06F 17/30575* (2013.01); *G06Q 10/10* (2013.01); *G06Q 10/1093* (2013.01); *G06Q 50/01* (2013.01)

(58) Field of Classification Search
CPC ...................................................... G07C 1/14
See application file for complete search history.

(56) References Cited

U.S. PATENT DOCUMENTS

2004/0225525 A1* 11/2004 Weitzman .............. G06Q 10/10
705/1.1
2006/0053279 A1* 3/2006 Coueignoux ........... H04L 51/12
713/154
(Continued)

OTHER PUBLICATIONS

Rosenblatt (Rosenblatt, Seth, Digsby CNET Editors' Review, Sep. 17, 2009, CBS Interactive Inc., p. 1).*
(Continued)

*Primary Examiner* — Michael A Keller
(74) *Attorney, Agent, or Firm* — One LLP; Joseph K. Liu

(57) ABSTRACT

Sales people (agents) get engaged with a lot of contacts from past, present and future prospects that manifests on multiple contact platforms. They end up having their contacts and calendars split in multiple places including communication and messages leading to inefficiencies, loss of business and delayed response time to the end customer. Customer Relationship Management today is still a one dimensional tool, one that featured Email as the core for direct agent-client relationship. CRM should be redefined and relabeled as Communication Management to open up the idea that relationships with clients are developed across multiple platforms though multiple channels. As will be understood by reading below, the invention accomplishes this in an elegant manner. The phrases Communication Management in the main patent title and Customer Relationship Management (CRM) have the same semantics in this document.

14 Claims, 12 Drawing Sheets

Diagram Showing Central Communication Panel (In/Out)

| Communication Log | Social Communication |

Search Communications

| First Name | | Last Name | |
| Comm. Type | All | Durations | All |
| From Date | | To Date | |
| Subject | | Description | |

SEARCH

| Type | Connection Name | Subject | Message / Post | Communication Type | Direction | Date /Time (PST) |
|------|----------------|---------|----------------|--------------------|-----------|------------------|
| f | Kate John | Wall Post | Search for your Dream Property | Facebook | OutBound | 9/27/2011 |
| t | Jennifer Davis | Tweet | Yes, our dashboard makes it very simple to upgrade | Twitter | InBound | 9/25/2011 |
| t | George Austin | Tweet | We do not include signs | Twitter | OutBound | 9/11/2011 |
| f | Mary Evans | Wall Post | Provide buyers with instant property information | Facebook | InBound | 9/082011 |
| f | Jacob Slive | Tweet | Fixed Monthly Price! No per message or lead charges! | Twitter | InBound | 8/25/2011 |
| t | Donna Smith | Wall Post | Access to online reports of properties and leads. | Facebook | InBound | 7/05/2011 |
| t | John James | Wall Post | Yes I do... | Facebook | InBound | 7/04/2011 |

Related U.S. Application Data

(60) Provisional application No. 61/455,538, filed on Oct. 21, 2010.

(51) Int. Cl.
   *G06Q 10/10* (2012.01)
   *G06F 17/30* (2006.01)
   *G06Q 50/00* (2012.01)

(56) References Cited

U.S. PATENT DOCUMENTS

| | | | |
|---|---|---|---|
| 2008/0009277 A1 | 1/2008 | Bidwell | |
| 2008/0021728 A1* | 1/2008 | Khoo | G06Q 30/02 705/1.1 |
| 2008/0168348 A1 | 7/2008 | Bergstrom et al. | |
| 2008/0177745 A1 | 7/2008 | Eldering et al. | |
| 2009/0171691 A1* | 7/2009 | Lubarski | G06F 17/3089 705/319 |
| 2009/0313299 A1* | 12/2009 | Bonev | G06Q 10/109 |
| 2010/0020949 A1 | 1/2010 | Robbins et al. | |
| 2010/0077027 A1 | 3/2010 | Chitturi et al. | |
| 2010/0123003 A1* | 5/2010 | Olson | G06Q 20/355 235/380 |
| 2010/0161369 A1* | 6/2010 | Farrell | G06Q 50/01 705/319 |
| 2010/0162105 A1* | 6/2010 | Beebe | G06Q 10/1093 715/273 |
| 2010/0180001 A1 | 7/2010 | Hardt | |
| 2010/0217809 A1 | 8/2010 | Vymenets et al. | |
| 2010/0228582 A1* | 9/2010 | King | G06Q 30/02 705/14.66 |
| 2010/0262491 A1* | 10/2010 | Siciliano | G06Q 30/02 705/14.51 |
| 2010/0325222 A1 | 12/2010 | Taylor et al. | |
| 2011/0029608 A1 | 2/2011 | Harple et al. | |
| 2011/0035464 A1 | 2/2011 | Dolin et al. | |
| 2011/0078190 A1 | 3/2011 | Samuel et al. | |
| 2011/0113084 A1 | 5/2011 | Ramnani | |
| 2011/0179161 A1 | 7/2011 | Guy et al. | |
| 2011/0289053 A1 | 11/2011 | Smarr et al. | |
| 2012/0060096 A1* | 3/2012 | Makam | G06Q 50/01 715/736 |
| 2013/0091204 A1 | 4/2013 | Loh et al. | |
| 2013/0117679 A1 | 5/2013 | Polis et al. | |

OTHER PUBLICATIONS

Chandler, Ashley, Ahold goes Google: International food retailer moves 55,000 employees to Google Apps, Sep. 16, 2010, Google Official Enterprise Blog, p. 1.

Ho, Erica, The Complete Guide to Creating a Consolidated, Master Contact List, Jun. 7, 2010, Lifehacker.com, pp. 1-4.

Mayhew, Bruce, Drip Marketing: Love Your Customers, 2008, Bruce Mayhew Consulting Communication Training, pp. 1-2.

Mccorvey, J.J., How to Use Google Apps to Improve Your Business, Jun. 1O2010, Inc.com, pp. 1 -3.

Orth, Eric, Use Microsoft Outlook with Google Apps for email, contacts, and calendar, Jun. 9, 2009, Google Official Enterprise Blog, pp. 1-2.

Parry, Chad, Import your mail and contacts from other accounts, May 13, 2009, Official Gmail Blog, p. 1.

Pash, Adam, Five Best Instant Messengers, Apr. 3, 2008, LifeHacker.com, p. 5.

Rosenblatt, Seth, Digsby CNET Editors' Review, Sep. 17, 2009, CBS Interactive Inc., p. 1.

Silverman, Matt, The Small Business Guide to Google Apps, Mar. 19, 2010, Mashable.com, p. 3-9.

Trapani, Gina, How to Make Your Small Business Look Big, Mar. 13, 2009, Harvard Business Review, pp. 1 -2.

Uberti, Justin, Say hello to Gmail voice and video chat, Nov. 11, 2008, Official Gmail Blog, pp. 1 -2.

* cited by examiner

Fig 1: Illustrative diagram of an industry grade cloud system
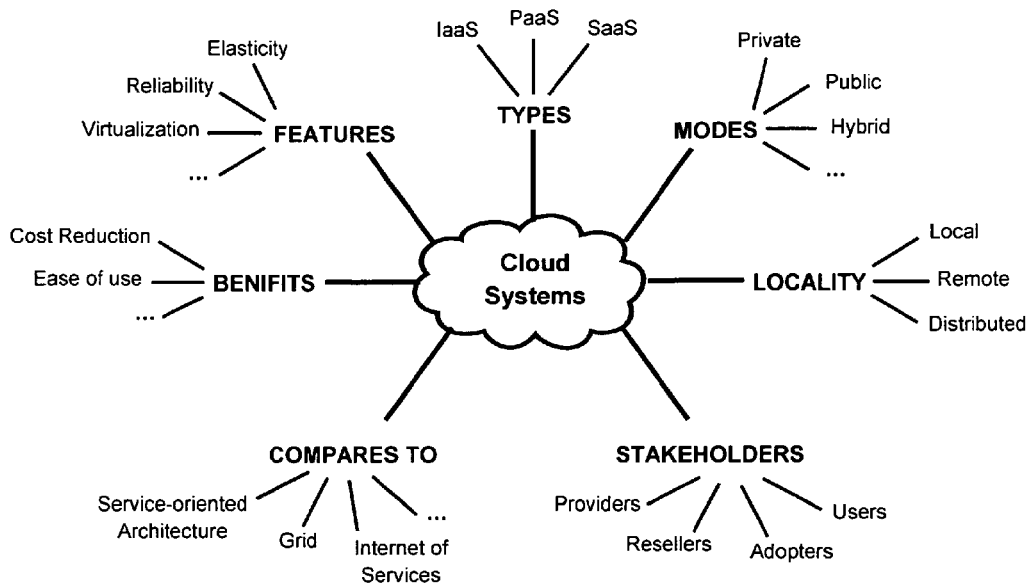
NON-EXHAUSTIVE VIEW ON THE MAIN ASPECTS FORMING A CLOUD SYSTEM Fig 2: Multi Channel Contact / Calendar / Communications
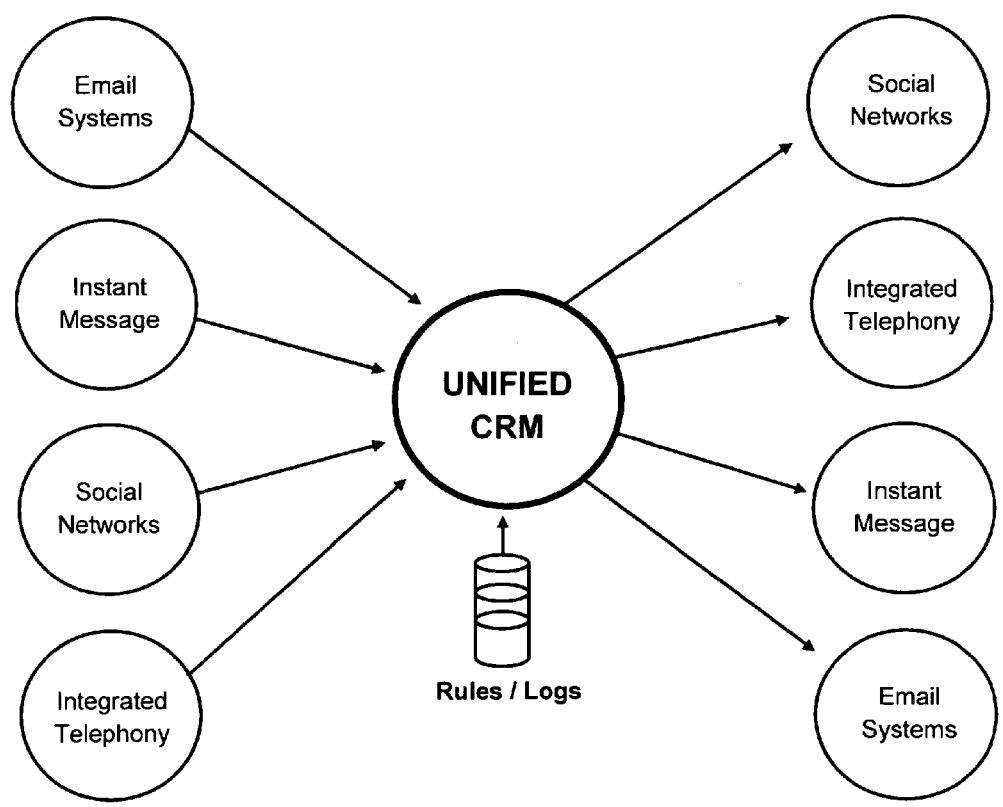

Fig 3: Architecture Diagram
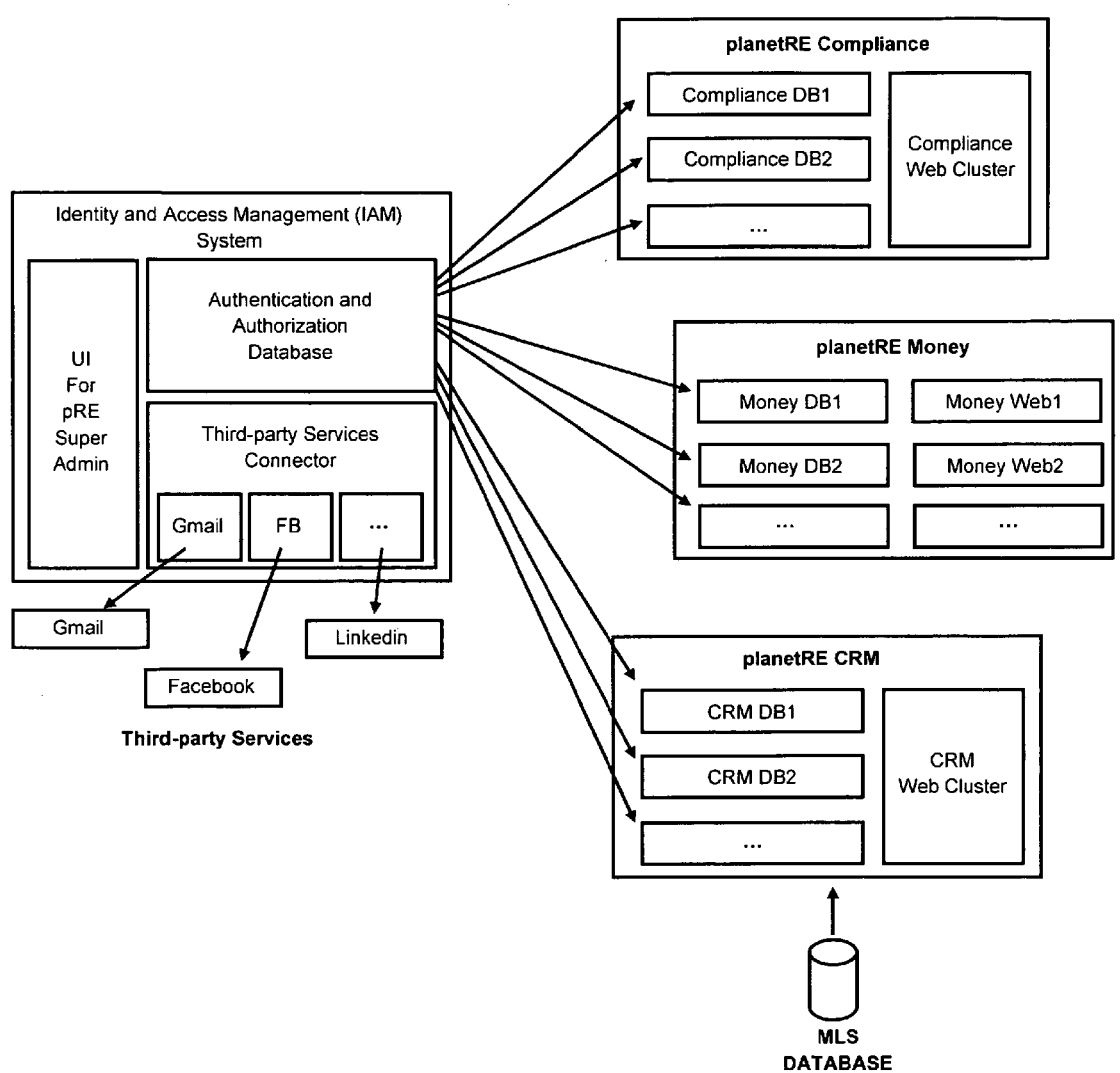

Fig 4: Panel Allowing multiple social contact / calendar synchs

| Home | Connections | Groups | Communications | Campaigns | Reports | Admin | Social Media | Calendar / Connections |

| Google Calendar | Gmail Contacts | Plaxo Contacts | FB Calendar | FB Contacts | Outlook Contacts |

Import Facebook Contacts

Read Contacts from Facebook

Note: Only those facebook users who shared contact information will be fetched

Save Selected Contacts

| Select | Picture | Name | Linked |
|---|---|---|---|
| ☐ | 👤 | Jennifer Davis | ✓ |
| ☐ | 👤 | George Auatin | ✓ |
| ☐ | 👤 | Bobmanuel Tonye | ✓ |
| ☐ | 👤 | Kate John | ✓ |
| ☐ | 👤 | John James | ✓ |
| ☐ | 👤 | Jacob Slive | ✓ |

Fig 5: Panel Showing Centralized Social Media Contacts & Calendar

| Home | Connections | Groups | Communications | Campaigns | Reports | Admin | Social Media | Calendar / Connections |
|---|---|---|---|---|---|---|---|---|

My Top Agents | My New Connections | My Alerts | My Appointments / Events

My Bizz | My Transaction | My Financials

| Contacts | Expand |
|---|---|
| John Jones | Pending |
| Jenifer Davis | Listed |
| Jim James | Referral |
| Smith Wills | Contact |
| | More.. |

| Calendars | | Expand |
|---|---|---|
| John Jones | 8.00AM | Outlook |
| Meet Donna Smith | 9.00AM | Company |
| Go to bank | 10.00AM | Google |
| Training | 11.00AM | Outlook |
| | | More.. |

| Communications | | Expand |
|---|---|---|
| John Jones | "Need to talk" | Facebook |
| Hugh Perry | Request to connect | Linkedin |
| Sly Dunbar | New Listing | Outlook |
| Pete Tosh | Attend Seminar | Gmail |
| | | More.. |

| Campaigns | Expand |
|---|---|
| John Jones | Pending |
| Jenifer Davis | Listed |
| Jim James | Referral |
| Smith Wills | Contact |
| | More.. |

Fig 6: Data Structure for Lead Type

| CommunicationThreads | Lead | |
|---|---|---|
| CommunicationThreadId<br>CommunicationId<br>CommunicationType<br>CommunicationDate<br>CommunicationDirection<br>CommunicationSubject<br>Communicationbody<br>CommunicationFileLocation | LeadId<br>FirstName<br>MiddleName<br>LastName<br>StreetNumber<br>StreetName<br>City<br>State<br>Zip<br>MobilePhone<br>HomePhone<br>WorkPhone<br>ExtentionPhone<br>AdditionalPhone<br>HomeFax<br>WorkFax<br>Email<br>CompanyId<br>IsActive<br>CreatedBy<br>CreatedDate<br>LModBy<br>LModDate<br>Unsubscribe<br>PropertyTypeBuyer<br>BedRoom<br>BathRoom<br>Stories<br>Garage<br>Age<br>SqFt<br>LotSize<br>PriceMin<br>PriceMax<br>TimeFrameFrom<br>TimeFrameTo<br>OtherInfo<br>City_s<br>PropertyTypeSeller<br>Bedroom_s<br>Bathroom_s<br>Stories_s<br>Garage_s<br>Age_s<br>SqFt_s<br>LotSize_s<br>PriceMin_s<br>PriceMaz_s<br>TimeFrameFrom_s<br>TimeFrameTo_s<br>OtherInfo_s<br>Gender<br>Employer<br>SpouseFirstName<br>SpouseMiddleName<br>SpouseLastName<br>SpouseGender<br>Children<br>IsPlaxo | IsGoogle<br>LeadType<br>LeadSource<br>LeadStatus<br>LeadAcquireDate<br>ExpectedLeadConversionDate<br>ActualLeadConversionDate<br>NextContactDate<br>OptInStatus<br>ListingNotify<br>OkayToIM<br>IsTopClient<br>AveragePrice<br>DOB<br>WeddingAnniversary<br>SaleAnniversary<br>SaleAnniversary<br>PurchaseAnniversary<br>PushedToPlaxoOn<br>PushedToGoogleOn |

Fig 7: Display of Multiple Social Channels Authorized Lead Sources

| | Home Connections Groups Communications Campaigns Reports Admin Social Media Calendar / Connections |
|---|---|

| Connection Home | New Connection | Search | Import Connections |
|---|---|---|---|

◉ Assign to Single Agent  ◉ Send to Multiple Agents
Office: [Select ▼]  Agent: [Select ▼]  Rating: [Select ▼] ★★★★★
27 connections found
Select All / Clear All

| Select | Name | Source | FB Search | LI Search | Delete |
|---|---|---|---|---|---|
| ☐ | Jennifer Davis | Linkedin | f🔍 | in🔍 | 🗑 |
| ☐ | George Austin | Facebook | f🔍 | in🔍 | 🗑 |
| ☐ | Bobmanuel Tonye | Facebook | f🔍 | in🔍 | 🗑 |
| ☐ | Kate John | Linkedin | f🔍 | in🔍 | 🗑 |
| ☐ | John James | Facebook | f🔍 | in🔍 | 🗑 |
| ☐ | Kelly G | Web Lead | f🔍 | in🔍 | 🗑 |
| ☐ | Mary Evans | Gmail | f🔍 | in🔍 | 🗑 |
| ☐ | Jacob Slive | Outlook | f🔍 | in🔍 | 🗑 |

Fig 8: Integrated Linked IN Search in CRM
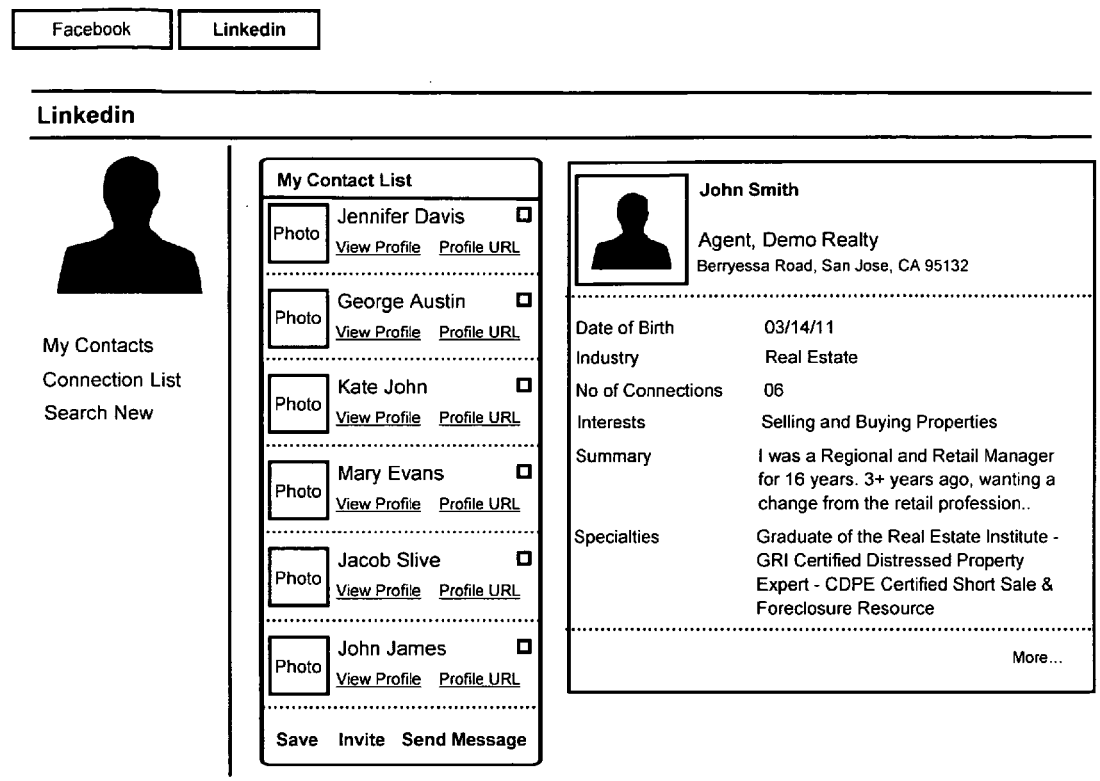

Fig 9a: Integrated Linked IN Search in CRM (part 1)

| Summary | Action Entry | Assign History | Send Email | Send Email | Communication Summary |
|---|---|---|---|---|---|

General Info

First Name
Middle Name
Last Name
Gender
Employer
Email
Mobile Phone
Work Phone
Home Phone
Extension Phone
Additional Phone
Fax Work
Fax Home

Spouse Info

First Name
Middle Name
Last Name
Spouse Gender
Children

Other Info

Facebook
Twitter
LinkedIn
Push to plaxo ☐
Push to Google ☐

Quick Stats

Account Created: 7/25/2011  4.00.36 AM
Last Contacted  9/21/2011  5.00.18 PM
Avg Price ($)
Okay to IM
Category
Source
Status
Is Top Client?
Group          No Group Assigned
Created-By     Company-Generated

Property Purchase Preferences

City/Area
Type of Property
Bedrooms
Bathrooms
Stories
Garage
Age
SqFt
Lot Size
Price Range
From [    ] To [    ]
Time Frame to buy:

Mailing Details

Street Address
City
State
Zip

Campaign

Unsubscribe ☐

Important Dates

Acquisition
Next Contact
Expected Conversation
Conversation
Date of Birth
Wedding Anniversary
Sale Anniversary
Purchase Anniversary

Comments

Fig 9b: Integrated Linked IN Search in CRM (part 2)

| | Personal Information | | Shared Networks |
|---|---|---|---|
| Photo | Name | Jennifer Davis | 👤 👤 👤 👤 |
| | Gender | Female | |
| | Hometown | San Diego, California | 👤 👤 👤 👤 |
| Send Gifts | About Me | I am a native of San Diego and a Graduate of the Oxford University. | |
| Write on wall | Birthday | 04/27/1985 | 👤 👤 👤 👤 |
| View full profile | Education | West High, Oxford University. | |
| | Work History | Real Estate | |
| Authentication Network | Books | you can win | |
| | Music | Eminem, Batboys, Shakira | |
| | Movies | Notebook. A walk to remember. | |
| | Activities | Swimming, Polo, Skating | |
| | Likes | Real Estate, California Agents, RealFace | |

Fig 10: Diagram Cross Referencing Leads with own network

Fig 11: Diagram Showing Central Communication Panel (In/Out)

Communication Log | Social Communication

Search Communications

First Name: [          ]   Last Name: [          ]
Comm. Type: [All ▼]   Durations: [All ▼]
From Date: [     ▼]   To Date: [     ▼]
Subject: [          ]   Description: [          ]

[ SEARCH ]

| Type | Connection Name | Subject | Message / Post | Communication Type | Direction | Date /Time (PST) |
|---|---|---|---|---|---|---|
| f | Kate John | Wall Post | Search for your Dream Property | Facebook | OutBound | 9/27/2011 |
| t | Jennifer Davis | Tweet | Yes, our dashboard makes it very simple to upgrade | Twitter | InBound | 9/25/2011 |
| t | George Austin | Tweet | We do not include signs | Twitter | OutBound | 9/11/2011 |
| f | Mary Evans | Wall Post | Provide buyers with instant property information | Facebook | InBound | 9/082011 |
| f | Jacob Slive | Tweet | Fixed Monthly Price! No per message or lead charges! | Twitter | InBound | 8/25/2011 |
| t | Donna Smith | Wall Post | Access to online reports of properties and leads. | Facebook | InBound | 7/05/2011 |
| t | John James | Wall Post | Yes I do... | Facebook | InBound | 7/04/2011 |

METHODS AND SYSTEMS FOR CREATING ONLINE UNIFIED CONTACT AND COMMUNICATION MANAGEMENT (CM) PLATFORM

CROSS-REFERENCE TO RELATED APPLICATIONS

This application is a continuation of U.S. application Ser. No. 13/200,773 filed Sep. 30, 2011, which claims the benefit of U.S. Provisional Application No. 61/455,538 filed Oct. 21, 2010, both of which are incorporated by reference herein.

COPYRIGHT NOTICE

A portion of the disclosure of this patent documentation contains material that is subject to copyright protection. The copyright owner has no objection to the facsimile reproduction by anyone of the patent document or the patent disclosure, as it appears in the Patent and Trademark Office Patent file or records, but otherwise reserves all copyright rights whatsoever.

SUMMARY OF THE INVENTION

The invention includes a method of centralizing and synchronizing contacts coming from all contact sources like emails, social media the salesperson subscribes to. Simple import of contacts can also be done using CSV imports from other legacy sources the user has. Rules may be established in all imports and synching to restrict to certain type of leads or be able to bulk them up in predefined social groups or annotated to an existing social campaign in progress.

In one embodiment, the invention may be configured to synchronize all contacts at once from one or more social channels OR driven by rules of synching based on user's preferences. The synched contact can be further authorized by acceptance as a friend or a contact by the lead from their own social media accounts which will proceed to show that a specific user is authorized and ready to communicate on one or more social channels. This authorization may be a prerequisite for user to communicate with leads and prospects on social media.

In a subsequent embodiment, new leads and prospects entered in the CRM manually or entered automatically through APIs from other sources or just coming from social media synchs described earlier may be cross referenced to multiple social media sources to get a better cross section of the user's profile on different social media channels. New contents could be created manually in the central database and same cross sections from different social media may be done to show the cross section to the user.

The features and functions of the invention may be implemented by encoding computer readable software in the form of Microsoft .NET, AJAX, C++ and SQL language or other computer readable formats that can configure a computer or server to perform the features and functions.

The invention may be designed and implemented on a computer and may be connected to a network for communication with many other computers to practice the invention. A system configured to operate according to the invention may include a plurality of PCs, Tablets or mobile PDAs connected to the internet via individual modems or other communication means such as Wi-Fi and Wireless 3G/4G communications. The invention may involve a number of functions to be performed by a computer processor, such as a microprocessor. The microprocessor may be specialized or dedicated microprocessor that is configured to perform certain tasks by executing machine readable software code for a particular task. The microprocessor may be configured to operate and communicate with other devices such as direct memory access modules, memory storage devices, internet related hardware and other devices that relate to the transmission of data in accordance with this invention. The software code may be configured using software formats like C++, C#, SQL, AJAX, SOL and XML language that may be used to define and present information that relate to operations of devices required to carry out the functional operations related to the invention. The code may be written in many forms and styles in the art of computer programming. Different code formats, code configurations, styles and forms of software programs and other means to configure and release the operation of the microprocessor in accordance with the invention will not depart from the spirit and scope of the inventions, which is defined by the detail description as well as subparts included therein.

In another aspect of the invention, allow synchronizing of multiple user calendars across multiple channels including email, local calendars, third party program that generate work flow calendars and one or more social media calendars. The system allows single calendar for the user from all sources. Subsequently, user can create new calendar events in the CRM and broadcast them back to one more calendar outlets they have including local calendar and social media calendars.

In another aspect of the invention, communication is done bi-directional between the user and all their leads hosted on multiple email system, instant messaging or social media or integrated telephony platforms. Mass micro blogs may be broadcasted from the CRM manually or done automatically using complex time and recipient criteria. One example of implementation is sending a pre created micro blog campaign and broadcasted xx days after the first contact date and sends to all contact that come from a specific Social Channel; contact type is HOT and contact category is investor and/or landlord. The system would store and retrieve all these logs on demand based on different search filters.

The core invention enables bi-directional contact, calendar synchs and communication to happen between the CRM user and their potential leads over the lead incubation period and also logging all events for any search required.

BRIEF DESCRIPTION OF THE DRAWINGS

FIG. 1 shows one sample illustrative diagram of a general cloud system with which the invention can be deployed. It could be deployed using on premise computing also.

FIG. 2 is a block diagram of the basic invention showing how various elements of contact, calendar and communications connect to the CRM, connect in the invention.

FIG. 3 is a diagram of the invention embedded in an overall enterprise architecture connecting to other transaction management and financial management (ERP) pieces.

FIG. 4 is a diagram showing of synching multiple social media contacts and calendars in one place.

FIG. 5 shows the display of such a central calendar and contact on main home page.

FIG. 6 is an exemplary data structure showing organization of lead data in the database.

FIG. 7 is an exemplary diagram showing how leads are displayed from multiple sources including authorization as shown with green check boxes.

FIG. 8 is an exemplary diagram showing how lead search happens on LinkedIn.

FIG. 9a and FIG. 9b are exemplary diagrams showing how detailed lead information stored on multiple social media in the central lead record.

FIG. 10 is an exemplary diagram showing how leads coming from one social channel can be cross referenced with the users' own social network.

FIG. 11 is an exemplary diagram showing Central Communication Panel for all Social Media for inbound/outbound social media messages

DETAILED DESCRIPTION OF THE PREFERRED EMBODIMENT

The present invention provides a software application configured for a sales person to connect and communicate concurrently with all their prospects across multiple social media channels including conventional email and be able to incubate the leads over the lead engagement cycle. It offers a robust system for a sales person to go to one place and manage all their contacts (leads), calendars and all aspects of their sales campaigns and communication over multiple social channels.

The admin panel in this software application defines what social media channels the sales person wishes to engage in their sales/marketing campaigns. E.g. Facebook, Twitter, Google+ etc. and also the system then connects the sales person actively to these channels using published APIs from these social channels. Traditional email campaigns are included but the dominant invention is the ability to engage communications concurrently with multiple social media channels for customer relationship management (CRM) and analytics on lead behavior.

Once established system will open connectors (See FIG. 3) to multiple social networking platforms like Google, Facebook, Twitter and LinkedIn and so on. This will give a universal ability for the sales person to track lead behavior on different social platforms. Using an Authorization and Authenticated database, this information is stored and retrieved in to CRM database pool or server farms and accessed with high speed. Such information can also be optionally replicated in to other Single Sign ON (SSO) systems like Transaction Management (shown in Compliance block) OR financial management (ERP) shown under Money block.

The CRM module may interface with an MLS module (Multiple Listing service or any paid sources of database) as shown in FIG. 3. This module may allow the user custom searching, reviewing and creating online flyers for multiple properties, custom drag and drop flyers. The MLS module integrates with a legacy based MLS system (not shown) to enable the import of legacy based MLS system data in to the CRM database such that the legacy based MLS system data is readily available to the managing of prospects and leads.

Using the application, the sales person (subscriber) can instantly connect to all selected contacts they have on many channels like Facebook, Google etc. They can further download all or preselected list of contacts in to the central CRM database (FIG. 4).

The same application allows users to modify the contents of some of these contacts and push/write back to the sources where they came from.

In FIG. 5, each user can see their own centralized contacts with different status and centralized calendars showing all events and sources from which they came from. They could optionally expand on this window to open up all the details of the contact or calendar in a new browser window.

FIG. 6 shows detailed database schema for one sample database tree hierarchy for the CRM. The communication threads are shown along with fields contained under Lead which stores all information related to contact/lead, items they are interested in, preferences in modes of communication and flags if they need to pushed automatically to other channels e.g. Plaxo or Google if any status changes.

As shown in FIG. 7, the software application also allows users to see instantly on the main connections dashboard as to which contact/leads came from which source and if they have been "authorized" to certain social media. This information is further carried to other modules within the CRM so user can choose to exercise the appropriate media for communication with the customer at any given point in time in the lead engagement cycle. A lead coming from one Source e.g. Facebook contact can also be searched automatically on another platform like LinkedIn allowing rich social media cross section of information for a given lead.

FIG. 8 is a powerful encapsulation of LinkedIn platform in the CRM targeted for recruitment. Once authorized and opened, it gives a display of the sales person own contact as shown in the middle column. Then they can see details of their own contacts OR search for NEW people on LinkedIn, authorize them and view them and start communicating with them, using the SEND MESSAGE command. FIGS. 9a and 9b (split screens) show the information on every prospect from social channels is stored permanently in the CRM database for the lead for future use and analytics.

FIG. 10 is yet another implemented feature of the CRM allowing users to cross connect their own harvested prospects with their own contacts to avoid duplication.

FIG. 11 shows the central communication log panels for searching all micro blogs, messages sent/received in the CRM for that account including email communications. These panels can be searched for a specific message based on date range, user types, social channel and whether it is INBOUND or OUTBOUND.

The invention is directed to an apparatus for receiving and processing lead and prospect data related to customer relationship management. The invention may also include a dedicated processor configured to communicate with computers that communicate among one or more networks to receive and transmit data packets related to performing this task. However, it will be appreciated by those skilled in the art, that this is illustrative of only one utility of the invention, and that the invention has greater applicability and utility in many other applications where efficient routines and processing of data for performing online CRM with one or more networks is involved. Equivalent structures embodying the invention could be configured for such applications without diverting from the spirit and scope of the invention. Although this embodiment is described and illustrated in the context of modern databases, the invention extends to other applications where similar features are useful. Furthermore, while the foregoing description has been with reference to particular embodiments of the invention, it will be appreciated that these are only illustrative of the invention and that changes may be made to those embodiments without departing from the principles of the invention, the scope of which is defined by this overall description or any subparts herein.

What is claimed is:

1. An online unified contact and communication management platform having one or more processors and a non-transitory computer-readable medium containing program instructions that cause said one or more processors to:

create and store user profiles associated with individual users, including individual user calendars in a database stored in non-transitory memory;

securely access a plurality of first user accounts associated with a first user on a plurality of social networking platforms via a computer network;

selectively import and store information associated with each of a plurality of contacts from the accessed first user accounts in an associated first user profile, wherein the plurality of contacts are associated with the first user accounts and are found by searching through the social networking platforms, through the unified contact and communication management platform, or both, and wherein contacts found by searching through the social networking platforms or through the unified contact and communication management platform can be selectively authorized to contact the first user account associated with the first user profile on the respective social networking platform; and selectively aggregate and update information for the plurality of imported contacts from the accessed accounts for the first user;

selectively set at least one automatic notification for at least one contact based on a contact related status update via a secondary communication;

securely export contact information for the first user contacts to a plurality of selected accounts at a plurality of social networking platforms using email, instant messaging, social networks, or integrated telephony;

securely import and store a plurality of first user calendars from one or more online accounts at a plurality of social networking platforms accessed by the first user via the network;

securely export selected calendar information from the database to a first user selected and authorized account on one of a plurality of social networking platforms using email, instant messaging, social networks, or integrated telephony; and wherein the online unified contact and communication management platform enables the first user to send and receive instant messages with the one or more imported contacts via the network, and wherein the platform can automatically transmit messages during a plurality of first user scheduled and timed micro-blog events to imported contacts via the network on the imported contacts' social media platform of origin, based on selective first user groupings, providing targeted campaigns based at least on the first user scheduling the timed micro-blog events during the targeted campaigns using the first user calendar.

2. The online unified contact and communication management platform of claim 1, wherein contacts and calendars are imported using software plug-in enabled on user's systems or browsers.

3. The online unified contact and communication management platform of claim 1, wherein the imported contacts are automatically grouped into social groups or made part of an existing social campaign.

4. The online unified contact and communication management platform of claim 1, further configured to authorize, provide and save social media searches.

5. The online unified contact and communication management platform of claim 1, wherein imported contact or calendar information from one social media source on a first social networking platform can be further used to cross-reference and search user profiles automatically from at least one other social media sources on at least one or more other social networking platforms concurrently and store cross-referenced information found by the search in the database.

6. The online unified contact and communication management platform of claim 1, further configured to selectively import and synchronize contacts via the network using rules.

7. The online unified contact and communication management platform of claim 1, further provides user communication with the plurality of social networking platforms via the network.

8. The online unified contact and communication platform of claim 1, wherein imported contacts are selectively grouped into one or more social groups or assigned to one or more new or existing social campaigns.

9. The online unified contact and communication platform of claim 8, wherein the one or more social groups or one or more new or existing social campaign is targeted to recruitment.

10. The online unified contact and communication platform of claim 8, wherein the one or more social groups or one or more new or existing social campaign is targeted to sales.

11. The online unified contact and communication platform of claim 8, further comprising:

selectively transmitting at least one message to contacts in the one or more social groups or assigned to the one or more new or existing social campaign based on a timing element.

12. The online unified contact and communication platform of claim 1, further comprising:

a transaction management platform coupled with the network and comprising at least one compliance database operable to receive information authentication and authorization information for users and contacts.

13. The online unified contact and communication platform of claim 1, further comprising:

a financial management platform coupled with the network and comprising at least one money database operable to receive information authentication and authorization information for users and contacts.

14. The online unified contact and communication platform of claim 1, further comprising at least one interface operable to provide custom searching, reviewing and creating online flyers for a plurality of properties.

* * * * *